(12) United States Patent
Schumacher et al.

(10) Patent No.: US 8,197,791 B2
(45) Date of Patent: *Jun. 12, 2012

(54) ALUMINIUM OXIDE POWDER, DISPERSION AND COATING COMPOSITION

(75) Inventors: Kai Schumacher, Hofheim (DE); Martin Moerters, Rheinfelden (DE); Juergen Flesch, Rayong (TH); Marcus Von Twistern, Mobile, AL (US); Volker Hamm, Bad Saeckingen (DE); Matthias Schmitt, Buggingen (DE); Harald Alff, Kahl (DE); Roland Schilling, Freigericht (DE)

(73) Assignee: Evonik Degussa GmbH, Essen (DE)

( * ) Notice: Subject to any disclaimer, the term of this patent is extended or adjusted under 35 U.S.C. 154(b) by 919 days.

This patent is subject to a terminal disclaimer.

(21) Appl. No.: 11/722,268

(22) PCT Filed: Dec. 20, 2005

(86) PCT No.: PCT/EP2005/056936
§ 371 (c)(1),
(2), (4) Date: Jun. 20, 2007

(87) PCT Pub. No.: WO2006/067127
PCT Pub. Date: Jun. 29, 2006

(65) Prior Publication Data
US 2009/0272937 A1 Nov. 5, 2009

(30) Foreign Application Priority Data
Dec. 22, 2004 (DE) .................. 10 2004 061 700

(51) Int. Cl.
*C01F 7/00* (2006.01)

(52) U.S. Cl. .......... 423/625; 423/133; 423/628; 516/93; 516/112; 106/484; 51/309

(58) Field of Classification Search .................. 423/625, 423/628, 133; 516/93, 112; 106/484; 51/309; 430/110
See application file for complete search history.

(56) References Cited

U.S. PATENT DOCUMENTS

| 4,154,812 | A  | * | 5/1979 | Sanchez et al. ............... 423/626 |
| 5,527,423 | A  | * | 6/1996 | Neville et al. ................. 438/693 |
| 6,063,354 | A  | * | 5/2000 | Mangold et al. .............. 423/336 |
| 6,440,187 | B1 | * | 8/2002 | Kasai et al. ..................... 51/309 |
| 6,680,109 | B1 | * | 1/2004 | Plambeck-Fischer et al. ............................. 428/323 |
| 6,887,559 | B1 | * | 5/2005 | Darsillo et al. ............... 428/206 |
| 7,067,105 | B2 | * | 6/2006 | Kogoi et al. .................. 423/625 |
| 7,749,322 | B2 | * | 7/2010 | Schumacher et al. ........ 106/484 |
| 2003/0077221 | A1 | * | 4/2003 | Chiruvolu et al. ............ 423/625 |
| 2003/0143346 | A1 | * | 7/2003 | Yoshizawa et al. .......... 428/32.1 |
| 2006/0104895 | A1 | * | 5/2006 | Bauer et al. ................... 423/625 |

FOREIGN PATENT DOCUMENTS

| EP | 0 395 925 | | 11/1990 |
| EP | 0 855 368 | | 7/1998 |
| EP | 1 083 151 | | 3/2001 |
| EP | 1 256 548 | | 11/2002 |
| EP | 1264705 | * | 12/2002 |
| EP | 1 331 102 | | 7/2003 |
| WO | 2005/061385 | * | 7/2005 |

* cited by examiner

*Primary Examiner* — Steven Bos
(74) *Attorney, Agent, or Firm* — Oblon, Spivak, McClelland, Maier & Neustadt, L.L.P.

(57) ABSTRACT

Aluminum oxide powder in the form of aggregates of primary-particles, which has a BET surface area of from 10 to 90 m2/g and comprises as crystalline phases, in addition to gamma-aluminum oxide and/or theta-aluminum oxide, at least 30% of delta-aluminum oxide. It is prepared by vaporizing aluminum chloride and burning the vapor together with hydrogen and air, the ratio of primary air/secondary air being 0.01 to 2, the exit speed $v_B$ of the reaction mixture from the burner being at least 10 m/s, the lambda value being 1 to 4, the gamma value being 1 to 3 and the value of gamma*$v_B$/lambda being greater than or equal to 55. Dispersion comprising the aluminum oxide powder. Coating composition comprising the dispersion.

15 Claims, No Drawings

ALUMINIUM OXIDE POWDER, DISPERSION AND COATING COMPOSITION

The invention relates to an aluminium oxide powder and the preparation thereof. The invention furthermore relates to a dispersion comprising the aluminium oxide powder, and to a coating composition comprising this dispersion.

Fine aluminium oxide particles are employed in ink jet recording media as a constituents of the ink receiving layer.

EP-A-1331102 discloses that it is advantageous if the ink receiving layer of an ink jet medium comprises at least 20% delta-aluminium oxide. The ink receiving layer can furthermore comprise theta- and gamma-aluminium oxide. In the case where the ink receiving layer is to comprise a mixture of delta-, gamma- and theta-aluminium oxide, there is the possibility on the one hand of calcining aluminium hydroxide at certain temperatures, and on the other hand of providing a physical mixture of the individual modifications. It is known that the aluminium oxide powders obtained by calcining cake to form larger aggregates which can scarcely be broken up again, even by subsequent dispersing. It is furthermore a disadvantage that the powders obtained by the precipitation process include impurities which cannot be tolerated in many fields of use.

EP-A-1256548 claims aluminium oxide particles which are either amorphous and/or contain the gamma, delta and theta modification and have an average primary particle size of from 5 to 100 nm and an average aggregate size of from 50 to 800 nm. The starting material for the preparation of these particles is aluminium chloride, which is obtained in an oxidative process at temperatures of from 500° C. to 1,300° C. in the presence of an oxidizing gas and water. However, it cannot be seen from EP-A-1256548 how the process is to be carried out in order to obtain a modification other than the gamma modification or an amorphous powder. The embodiment examples, which cover a wide range of the process parameters, lead exclusively to gamma-aluminium oxide (Examples 1-3, 5, 6) or to amorphous aluminium oxide (Example 4). That in EP-A-1256548 can be employed, inter alia, for ink jet uses.

EP-A-1264705 discloses that delta-aluminium oxide can be particularly advantageously employed for ink jet coatings. However, the Aluminiumoxid C® (Degussa) employed in the examples has only a low content of delta-aluminium oxide, in contrast to the information provided.

SpectrAl®51 (Cabot) is an aluminium oxide powder having a BET surface area of 55 m$^2$/g, which is prepared by flame hydrolysis, has a content of the delta modification of 20% and is free from the gamma modification (Cabot Product Information, 2003). This powder can be employed, inter alia, for ink jet uses.

The object of the invention is to provide an aluminium oxide powder which can be advantageously employed as a constituent of an ink jet receiving layer. In particular, it should lead to a good ink receiving capacity, fast drying times and high gloss on ink jet recording media.

The object of the invention is furthermore to provide a process for the preparation of this aluminium oxide powder.

The object of the invention is furthermore to provide a dispersion which comprises this aluminium oxide powder.

The object of the invention is furthermore to provide a coating composition which comprises this aluminium oxide powder.

The present invention provides an aluminium oxide powder in the form of aggregates of primary particles, which has a BET surface area of from 10 to 90 m$^2$/g and comprises as crystalline phases, in addition to gamma-aluminium oxide and/or theta-aluminium oxide, at least 30 wt. % of delta-aluminium oxide.

The percentage data relate to the sum of the crystalline constituents. The contents of crystalline phases are determined by X-ray diffraction analysis. Other phases cannot be detected by means of this analytical method.

The aluminium oxide powder according to the invention is in the form of aggregates of primary particles. The primary particles are not porous. The surfaces of these primary particles have hydroxyl groups.

The BET surface area of the aluminium oxide powder according to the invention can be 30 to 70 m$^2$/g, and particularly preferably 45 to 65 m$^2$/g.

The content of delta-aluminium oxide of the aluminium oxide powder according to the invention can preferably be 70 wt. % to 95 wt. %.

In addition to the crystalline delta-, gamma- and theta-aluminium oxide modification, the aluminium oxide powder according to the invention can also comprise amorphous aluminium oxide constituents. The content of amorphous aluminium oxide is preferably less than 5 wt. % and particularly preferably less than 2 wt. %, in each case based on the total amount of the aluminium oxide powder. The contents of amorphous aluminium oxide can be estimated from an X-ray diffraction diagram.

An aluminium oxide powder according to the invention which has a BET surface area of 40 to 60 m$^2$/g and a content of delta-aluminium oxide of 80% to 90 wt. % and a content of theta-aluminium oxide and/or gamma-aluminium oxide of 10 to 20 wt. %, in each case based on the sum of the crystalline constituents, can be particularly advantageous.

An aluminium oxide powder according to the invention which has a BET surface area of 70 to 90 m$^2$/g and a content of delta-aluminium oxide of 30% to 40 wt. % and a content of theta-aluminium oxide of 0 to 5 wt. % and a content of gamma-aluminium oxide of 60% to 70 wt. %, in each case based on the sum of the crystalline constituents, can furthermore be particularly advantageous.

It has furthermore proved advantageous if the aluminium oxide powder according to the invention has a hydroxyl group density of greater than 8 OH/nm$^2$. At a value of greater than 8 OH/nm$^2$, a particularly good ease of incorporation of the powder into aqueous media is observed. A hydroxyl group density of from 9 to 12 OH/nm$^2$ is particularly advantageous.

It may furthermore be advantageous if the tamped density of the powder according to the invention is 10 to 200 g/l. A range of from 35 to 135 g/l may be particularly preferred. Here also, it is observed that in this range the powder according to the invention can be incorporated particularly readily into aqueous media.

The present invention also provides a process in which aluminium chloride is vaporized and the vapour is transferred into a mixing chamber by means of a carrier gas and separately from this, hydrogen, air (primary air), which can optionally be enriched with oxygen and/or preheated, is transferred into the mixing chamber, subsequently the mixture of aluminium chloride vapour, hydrogen and air is ignited in a burner and the flame burns into a reaction chamber which is separated off from ambient air, secondary air is additionally introduced into the reaction chamber, the solid is then separated off from gaseous substances and is subsequently treated with steam and optionally air, wherein
the ratio of primary air/secondary air is 0.01 to 2,
the exit speed VB of the reaction mixture from the burner is at least 10 m/s,
the lambda value is 1 to 4,
the gamma value is 1 to 3 and
the value of gamma*$v_B$/lambda is greater than or equal to 55.

The process according to the invention is a flame hydrolysis process.

Preferably, the lambda values can be 1 to 2.5, the gamma values 1 to 2 and the values of gamma*$v_B$/lambda 55 to 200. gamma and lambda are defined as follows:
gamma=$H_2$ fed in/$H_2$ required stoichiometrically,
lambda=$O_2$ fed in/$O_2$ required stoichiometrically. In this context, lambda includes the total oxygen introduced from primary air and secondary air.

Preferably, in this context, a ratio of primary air/secondary air which is between 0.15 and 1.5 can be chosen.

The present invention also provides a dispersion comprising 10 to 60 wt. % of the aluminium oxide powder according to the invention.

Suitable dispersing agents of the dispersion according to the invention are water and/or organic solvents, such as alcohols having 1 to 8 carbon atoms, in particular methanol, ethanol, n-propanol and i-propanol, butanol, octanol, cyclohexanol, ketones having 1 to 8 carbon atoms, in particular acetone, butanone and cyclohexanone, esters, in particular ethyl acetate and glycol esters, ethers, in particular diethyl ether, dibutyl ether, anisole, dioxane, tetrahydrofuran and tetrahydropyran, glycol ethers, in particular mono-, di-, tri- and polyglycol ethers, glycols, in particular ethylene glycol, diethylene glycol and propylene glycol, amides and other nitrogen compounds, in particular dimethylacetamide, dimethylformamide, pyridine, N-methylpyrrolidine and acetonitrile, sulfoxides and sulfones, in particular sulfolane and dimethylsulfoxide, nitro compounds, such as nitrobenzene, halohydrocarbons, in particular methylene chloride, chloroform, carbon tetrachloride, tri- and tetrachloroethene and ethylene chloride, chlorofluorocarbons, aliphatic, alicyclic or aromatic hydrocarbons having 5 to 15 carbon atoms, in particular pentane, hexane, heptane and octane, cyclohexane, benzines, petroleum ether, methylcyclohexane, decalin, benzene, toluene and xylenes. Particularly preferred organic dispersing agents are ethanol, n- and i-propanol, ethylene glycol, hexane, heptane, toluene and o-, m- and p-xylene.

Mixtures of the abovementioned compounds can also serve as dispersing agents, in which case these must be miscible and form only one phase.

Water is a particularly preferred dispersing agent.

The dispersion according to the invention can furthermore comprise substances for adjusting the pH, such as acids, bases or buffer systems, additives for stabilizing the dispersion, such as salts, surface-active substances, organic solvents, bactericides and/or fungicides.

The dispersion according to the invention can be obtained by predispersing the aluminium oxide powder according to the invention in a dispersing agent, preferably water, and then dispersing it. Dissolvers or toothed discs, for example, are suitable for the predispersing. Rotor-stator machines, such as Ultra Turrax (IKA), or those from Ystral, and furthermore bead mills or stirred bead mills are suitable for the dispersing. Higher energy inputs are possible with a planetary kneader/mixer. However, the efficiency of this system is associated with a sufficiently high viscosity of the processed mixture, in order to introduce the high shearing energies required for breaking up the particles. Dispersions having average aggregate diameters of less than 200 nm, preferably 70 to 150 mm, can be obtained using high pressure homogenizers. In these devices, two predispersed suspension streams under a high pressure are let down via a nozzle. The two dispersion jets impinge exactly on one another and the particles grind themselves. In another embodiment, the predispersion is likewise placed under a high pressure, but the collision of the particles takes place against armoured wall regions. The operation can be repeated as often as desired, in order to obtain smaller particle sizes. The process described in the German patent application with the reference 10360766.8 and the application date of 23 Dec. 2003 can be particularly advantageously employed.

The present invention also provides the use of the dispersion according to the invention for the preparation of ink jet recording media and for chemical-mechanical polishing.

The invention also provides a coating composition which comprises the dispersion according to the invention and at least one binder, which is preferably hydrophilic.

Binders which can be used are: polyvinyl alcohol, partly or completely saponified, and cationized polyvinyl alcohol with a primary, secondary or tertiary amino group or a tertiary ammonium group on the main chain or on the side chain. Furthermore, combinations of these polyvinyl alcohols with one another and polyvinylpyrrolidone, polyvinyl acetates, silanized polyvinyl alcohols, styrene/acrylate latices, styrene/butadiene latices, melamine resins, ethylene/vinyl acetate copolymers, polyurethane resins, synthetic resins, such as polymethyl methacrylates, polyester resins (e.g. unsaturated polyester resins), polyacrylates, modified starch, casein, gelatine and/or cellulose derivatives (e.g. carboxymethylcellulose).

Polyvinyl alcohol or cationized polyvinyl alcohol can preferably be employed.

The coating composition can furthermore also additionally comprise one or more other pigments, such as calcium carbonates, laminar silicates, aluminium silicates, plastic pigments (e.g. polystyrene, polyethylene, polypropylene), silicas (e.g. colloidal silicas, precipitated silicas), silica gels, cationized variants of the silica compounds mentioned, aluminium compounds (e.g. aluminium sols, colloidal aluminium oxides and hydroxy compounds thereof, such as pseudoboehmites, boehmites, aluminium hydroxide), magnesium oxide, zinc oxide, zirconium oxide, magnesium carbonates, kaolin, clay, talc, calcium sulfate, zinc carbonate, satin white, lithopones and zeolites.

The coating composition can preferably have a content of aluminium oxide particles of between 10 and 60 wt. %. It can preferably be greater than 15 wt. %, and it can particularly preferably be greater than 25 wt. %.

The coating composition can furthermore have a content of binder, based on the aluminium oxide powder, which is between 3 and 150 wt. %. It can preferably be between 10 and 40 wt. %, and it can very particularly preferably be between 3 and 15 wt. %.

Crosslinking agents can serve to increase the resistance of the binder system and therefore of the coating to water, such as zirconium oxides, boric acid, melamine resins, glyoxal and isocyanates and other molecules which join the molecular chains of the binder system to one another.

Auxiliary substances, such as optical brighteners, defoamers, wetting agents, pH buffers, UV absorbers and viscosity auxiliaries, can furthermore be employed.

The coating composition can be prepared by adding, while stirring, the dispersion according to the invention to a solution of the binder, to which further additives can optionally also be added, and optionally diluting the mixture until the desired ratio of aluminium oxide powder and binder and the desired total solids content are established. The sequence of the addition is not important in this context. The mixture is optionally stirred for a certain period of time and, if necessary, subsequently deaerated in vacuo. Additives are to be understood as meaning, for example, pigments, crosslinking agents, optical brighteners, defoamers, wetting agents, pH buffers, UV absorbers and viscosity auxiliaries.

The present invention also provides the use of the coating composition according to the invention for the preparation of ink jet recording media.

EXAMPLES

Example 1

4.5 kg/h of $AlCl_3$ are vaporized. The vapours are transferred by means of an inert gas into a mixing chamber. Separately from this, 2.1 $Nm^3$/h of hydrogen and 5 $Nm^3$/h of primary air are introduced into the mixing chamber. The reaction mixture is fed in a central tube to a burner and ignited. The exit speed of the reaction mixture from the burner is 33.1 m/s. The flame burns here in a water-cooled reaction chamber. 15 $Nm^3$/h of secondary air are additionally introduced into the reaction chamber. The powder formed is deposited in a downstream filter and then treated with air and steam in counter-current at approx. 700° C.

Examples 2 to 6 are carried out analogously to Example 1, changes to the reaction conditions being found in Table 1.

The physico-chemical data of the powders of Examples 1 to 6 are reproduced in Table 1.

Examples 1 to 3 lead to aluminium oxide powders according to the invention having values for the BET surface area of 49.54 and 89 $m^2$/g and a content of delta-aluminium oxide of from 30 to 90 wt. %. The values for gamma, lambda, $v_B$ and gamma*$v_B$/lambda and the ratio of primary air to secondary air are within the ranges claimed.

The aluminium oxide powder obtained in Example 4, on the other hand, has too high a BET surface area with too low a content of delta-aluminium oxide. The values for gamma, lambda and $v_B$ and the ratio of primary air to secondary air here are indeed within the range claimed, but the value for gamma*$v_B$/lambda lies outside.

The aluminium oxide powder obtained in Example 5 has too high a BET surface area, and at the same time no delta-aluminium oxide is detectable. In this example, the values for lambda and $v_B$ and the value for gamma*$v_B$/lambda and the ratio of primary air to secondary air, but not the gamma value, are within the range claimed.

The aluminium oxide powder obtained in Example 6 has too low a content of delta-aluminium oxide. In this example, the values for gamma, lambda and $v_B$ and the value for gamma*$v_B$/lambda, but not the ratio of primary air to secondary air, are within the range claimed.

Dispersions:

Dispersion 1: 80 kg of the aluminium oxide powder described in Example 1, corresponding to 20 wt. % aluminium oxide, are introduced in portions into 280 litres of deionized water, the pH of which is adjusted to 3.9 with propionic acid, under dispersing conditions (rotor-stator unit) and dispersing is carried out with . . . introduced into the water. After the total amount of powder has been incorporated, the suspension obtained is subjected to intensive shear forces for approx. 60 minutes. During the introduction of the powder, the pH is kept at between 4.0 and 4.1 by addition of propionic acid. The average aggregate size in the dispersion is 136 nm (determined by means of dynamic light scattering).

Dispersion 2: A portion of the dispersions is ground further with a high pressure homogenizer, Ultimaizer System from Sugino Machine Ltd., model HJP-25050, but with a three-jet chamber instead of the two-jet chamber installed in the Ultimaizer System. (The Ultimaizer System is used only as a high pressure pump.) The three-jet chamber divides the predispersion, which is under a high pressure, into three part streams, each of which is let down via a diamond nozzle having a diameter of 0.25 mm. The three dispersion jets emerging at a very high speed meet in a collision point, the dispersing/grinding effect to be attained being achieved. The collision point is surrounded tetrahedrally by beads (three base beads each 8 mm, upper bead 10 mm) of sapphire. Since all three jets of liquid lie in a common imaginary plane, the angle with respect to the adjacent jet is in each case 120°. 250 MPa is chosen as the pressure for grinding the aluminium oxide predispersion. The dispersion can then be cooled without

TABLE 1

Starting substances and amounts; physico-chemical values of the aluminium oxide powders

| | | According to the invention | | | Comparison | | |
|---|---|---|---|---|---|---|---|
| Example | | 1 | 2 | 3 | 4 | 5 | 6 |
| $AlCl_3$ | kg/h | 4.50 | 4.50 | 4.50 | 4.50 | 2.76 | 4.50 |
| Hydrogen | $Nm^3$/h | 2.10 | 2.60 | 2.70 | 1.80 | 3.04 | 2.00 |
| Primary air | $Nm^3$/h | 5.00 | 5.25 | 4.60 | 5.00 | 10.00 | 5.00 |
| Secondary air | $Nm^3$/h | 15.0 | 16.0 | 16.0 | 15.0 | 20.00 | 2.00 |
| Primary/secondary air | | 0.3 | 0.3 | 0.28 | 0.3 | 0.5 | 2.50 |
| gamma[#] | | 1.85 | 2.29 | 2.38 | 1.59 | 4.37 | 1.76 |
| lambda[#] | | 1.0 | 1.0 | 1.01 | 1.16 | 1.38 | 1.05 |
| $v_B$* | m/s | 33.1 | 34.7 | 33.5 | 32.0 | 31.4 | 32.7 |
| gamma*$v_B$/lambda | m/s | 61.5 | 79.5 | 78.8 | 43.7 | 99.4 | 54.8 |
| BET | $m^2$/g | 89 | 54 | 49 | 113 | 175 | 91 |
| delta-$Al_2O_3$ | wt. % | 30 | 85 | 90 | 10 | 0 | 25 |
| theta-$Al_2O_3$ | wt. % | 0 | 5 | 10 | 0 | 0 | 0 |
| gamma-$Al_2O_3$ | wt. % | 70 | 10 | 0 | 90 | 100 | 75 |
| Tamped density | g/l | 38 | 54 | 64 | 32 | 26 | 26 |
| OH density | OH/$nm^2$ | 9.4 | 9.1 | 10.2 | — | — | — |
| pH | | 5.31 | 6.07 | 5.56 | 5.4 | 5.3 | 5.2 |

*$v_B$ = exit speed from the burner;
[#]based on the core gases of primary air, hydrogen, inert gas problems with the aid of a conventional heat exchanger. The average aggregate size in the dispersion is 51 nm (determined by means of dynamic light scattering).

Staining Colours

Staining colour A: An aqueous polyvinyl alcohol solution (PVA Mowiol 40-88, Clariant) having a solids content of 12.26% is initially introduced into a glass beaker, and an amount of water is added such that, after addition of dispersion 2, a staining colour having a solids content of 34 wt. % is obtained. The particular dispersion is added here to the polyvinyl alcohol solution, to which water has been added, while stirring with a dissolver disc at 500 revolutions per minute (rpm). When the addition has ended, the mixture is subsequently stirred at 500 rpm for a further 30 minutes. Thereafter, the staining colours are deaerated with the aid of a desiccator and a water jet pump.

Staining colour B: As staining colour A, but the aqueous polyvinyl alcohol solution (PVA Mowiol 26-98, Clariant) has a solids content of 13.30 wt. %. The solids content of the staining colour is adjusted to 26 wt. %.

Staining colour C: As staining colour A. The solids content of the staining colour is adjusted to 26 wt. %.

The staining colours are distinguished by a very low viscosity.

Ink Receiving Media

Staining colours A and B are applied to a matt ink jet paper (Zweckform, no. 2576) with the aid of a 24 micrometer wet film spiral blade. Drying is carried out with a hairdryer. The coated paper is then satinized with the aid of a laboratory calender under a pressure of 10 bar at 50° C. The rate of application obtained for staining colour A is 12 g/m$^2$, and that for B is 15 g/m$^2$. The coated papers are printed on with an Epson Stylus Color 980 with the settings of premium glossy photo paper, 1,440 dpi, bidirectional, calibration Epson, gamma (D): 1.8 using an internal test image.

Staining colour C is applied to a 100 micrometer thick, untreated polyester film (Benn) with the aid of a 100 micrometer wet film spiral blade. Drying is carried out with a hairdryer. The coated films are printed on with an Epson Stylus Color 980 with the settings of photo quality glossy film, 1,440 dp, calibration Epson, gamma (D): 1.8 using an internal test image.

The visual gloss, adhesion and test image impression which is obtained with the staining colours is good to very good.

The invention claimed is:

1. An aluminium oxide powder in the form of aggregates of primary particles, wherein each particle has a BET surface area of from 10 to 90 m$^2$/g and comprises as crystalline phases, in addition to gamma-aluminium oxide and/or theta-aluminium oxide, at least 30% by weight of delta-aluminium oxide, and wherein the aluminium oxide powder has a tamped density of 10 to 200 g/l.

2. The aluminium oxide powder according to claim 1, wherein the BET surface area is 30 to 70 m$^2$/g.

3. The aluminium oxide powder according to claim 1, wherein the content of delta-aluminium oxide is 70% to 95% by weight.

4. The aluminium oxide powder according to claim 2, wherein the content of delta-aluminium oxide is 70% by weight to 95% by weight.

5. The aluminium oxide powder according to claim 1, comprising amorphous aluminium oxide.

6. The aluminium oxide powder according to claim 1, wherein the BET surface area is 40 to 60 m$^2$/g, the content of delta-aluminium oxide is 80% by weight to 90% by weight and the content of theta-aluminium oxide and/or gamma-aluminium oxide is 10 to 20% by weight.

7. The aluminium oxide powder according to claim 1, wherein the BET surface area is 70 to 90 m$^2$/g, the content of delta-aluminium oxide is 30% by weight to 40% by weight, the content of theta-aluminium oxide is 0 to 5% by weight and the content of gamma-aluminium oxide is 60 to 70 wt. % by weight.

8. A process for the preparation of the aluminium oxide powder according to claim 1, the process comprising:
vaporizing aluminium chloride and transferring the vapour into a mixing chamber with a carrier gas and
separately from the vaporizing of aluminium chloride, transferring hydrogen and primary air, which can optionally be enriched with oxygen and/or preheated, into the mixing chamber to yield a reaction mixture of aluminium chloride vapour, hydrogen and primary air,
subsequently igniting the mixture of aluminium chloride vapour, hydrogen and air with a flame burner so that the flame burns in a reaction chamber which is separated from ambient air,
introducing additional secondary air into the reaction chamber, and
separating a solid obtained in the reaction chamber from gases and subsequently treating the solid with steam and optionally air,
wherein
the primary air/secondary air ratio is 0.01 to 2,
the exit speed $v_B$ of the reaction mixture from the burner is at least 10 m/s,
a lambda value is 1 to 4,
a gamma value is 1 to 3 and
the value of gamma*$v_B$/lambda is greater than or equal to 55.

9. A dispersion comprising 10 to 60 wt. % of the aluminium oxide powder according to claim 1.

10. The dispersion according to claim 9, wherein the average aggregate diameter of the aggregates of primary particles in the dispersion is less than 200 nm.

11. A method of chemical-mechanical polishing, the method comprising applying the dispersion according to claim 9 to a surface to be polished.

12. A coating composition comprising the dispersion according to claim 9 and at least one binder.

13. A coating composition comprising the dispersion according to claim 10 and at least one binder.

14. A coating composition according to claim 12, wherein the content of binder, based on the aluminium oxide powder, is between 3 and 150 wt. %.

15. A coating composition according to claim 13, wherein the content of binder, based on the aluminium oxide powder, is between 3 and 150 wt. %.

* * * * *